United States Patent [19]

Hirano

[11] 4,336,852

[45] Jun. 29, 1982

[54] COMBINATION WEIGHING DEVICE

[75] Inventor: Takashi Hirano, Kobe, Japan

[73] Assignee: Yamato Scale Company, Ltd., Hyogo, Japan

[21] Appl. No.: 215,819

[22] Filed: Dec. 12, 1980

[30] Foreign Application Priority Data

Dec. 24, 1979 [JP] Japan ................................ 54-168816

[51] Int. Cl.$^3$ .......................... G01G 19/04; B07C 5/16
[52] U.S. Cl. ....................................... 177/25; 209/592; 177/128
[58] Field of Search ............................. 177/25, 1, 128; 209/592-596

[56] References Cited

U.S. PATENT DOCUMENTS

| | | | |
|---|---|---|---|
| 2,802,658 | 8/1957 | Hensgen et al. | 177/1 |
| 3,708,025 | 1/1973 | Soler et al. | 177/1 |
| 3,939,928 | 2/1976 | Murakami et al. | 177/1 X |
| 4,206,822 | 6/1980 | Mazzucchelli | 177/25 |

Primary Examiner—George H. Miller, Jr.
Attorney, Agent, or Firm—Eugene E. Geoffrey, Jr.

[57] ABSTRACT

A combination weighing device having a plurality of weighing balances, an arithmetic unit for receiving outputs from said weighing balances and computing sums of selected groups of signals from the weighing balances, comparing the sums with a predetermined weight range and producing a signal when a sum is within the range and control switch means connected with said weighing balances to inhibit transmission of signals from selected balances to the arithmetic unit.

2 Claims, 1 Drawing Figure

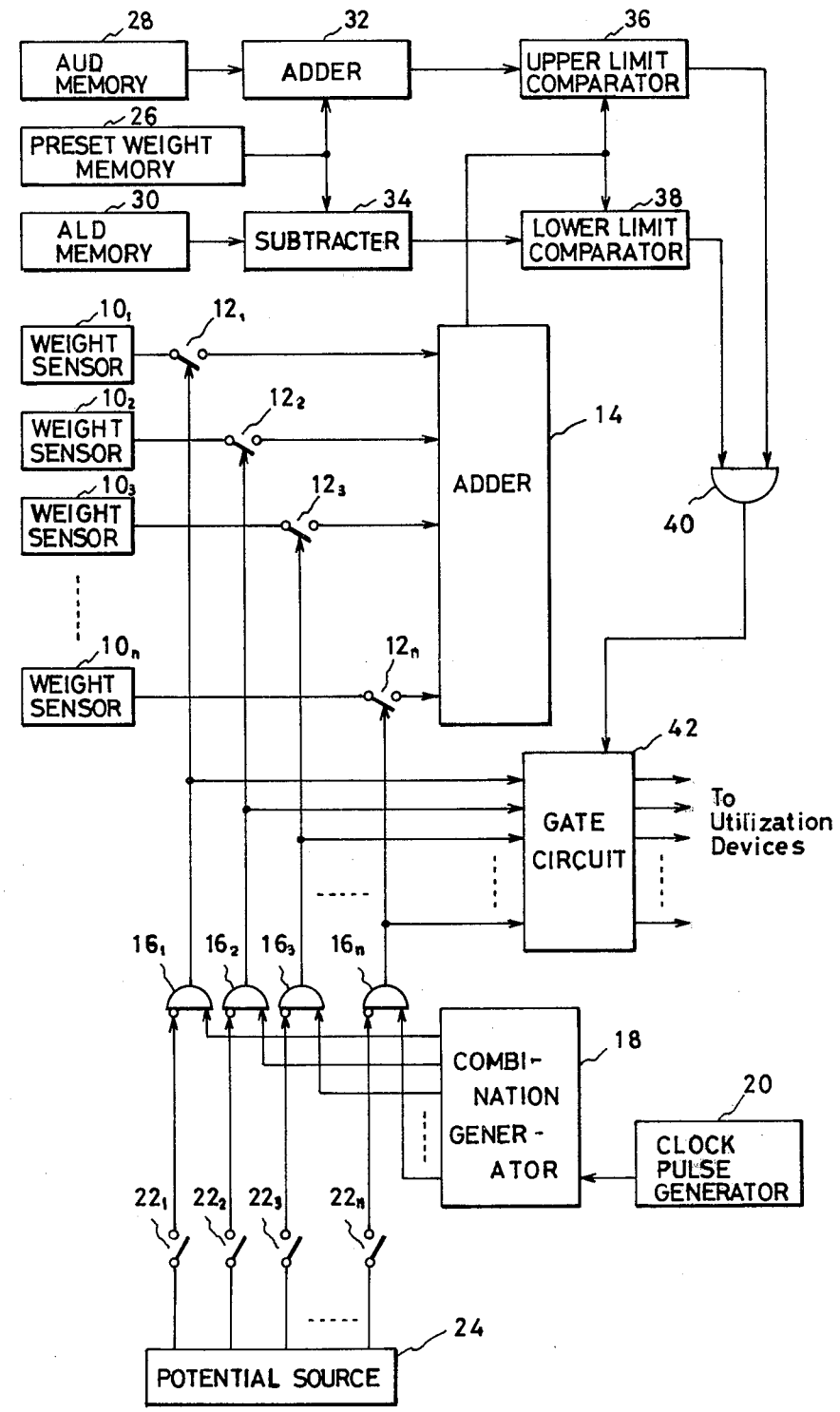

COMBINATION WEIGHING DEVICE

This invention relates to a combination weighing device, and particularly to a device for use in instances wherein a plurality of articles are packed together with each pack having nearly constant weight.

The weighing device which is generally referred to as a "combination balance" or "combination weighing device" is used for extracting and collecting a plurality of articles from a group of articles, such as cakes, fish and vegetables, having relatively large variances in respective weights, so that the extracted group has a weight which is nearly equal to a predetermined intended weight which will be hereinunder referred to as "preset weight." A typical example of such a device is disclosed in U.S. Pat. No. 3,939,928 and another example which is improved over this U.S. patent in arithmetic arrangement is described in the pending U.S. Patent application Ser. No. 102,660 filed Dec. 12, 1979, Australian Patent Application No. 53428/79 filed Dec. 4, 1979, British Patent Application No. 7942517 filed Dec. 10, 1979, French Patent Application No. 7930299 filed Dec. 11, 1979 or German Patent Application No. P 2949781.2 filed Dec. 11, 1979. In those devices, a plurality of articles are weighed individually by the same number of weighing balances at the same time. All mathematical combinations of the respective weights are summed respectively and the preset weight is subtracted from the respective sums to obtain corresponding deviations. Thus, the combination providing the least deviation is selected. In the prior art combination weighing devices, however, when even one of the weighing balances has become out of order, it is necessary to stop operation of the whole device to repair the defective balance. This reduces severely the active time efficiency of the device.

Accordingly, an object of this invention is to provide an improved combination weighing device having means for enabling the repair or other maintenance operation to any weighing balance without the need for interruption of the normal operation of the device.

According to this invention, a combination weighing device comprises a plurality of weighing balances for respectively measuring weights of a plurality of articles each to produce weight signals representative of these weights, an arithmetic unit having a plurality of inputs for summing up the weight signals received and comparing the sum with a predetermined range of weight to produce an output when the sum is within this range, a plurality of normally-open switches coupled respectively between the weighing balances and the inputs of the arithmetic unit, switch control means having a plurality of outputs coupled respectively to the control inputs of the normally-open switches for providing control signals successively from the outputs selected in accordance with a predetermined set of combinations, and means for supplying the control signals from the switch control means to utilization devices, such as gate control devices for controlling exhaust gates of the respective weighing balances, in response to the output of the arithmetic unit. According to a feature of this invention, the device further comprises means for inhibiting closure of some of the normally-open switches optionally regardless of the selection by the switch control means.

These and other objects and features of this invention will be described in more detail hereinunder with reference to the accompanying drawing.

The single drawing is a schematic block diagram of an essential part of an embodiment of the combination weighing device according to this invention.

The device includes a plurality of weighing balances (not shown) provided respectively with weight sensors $10_1, 10_2, \ldots 10_n$. The weight sensors $10_1, 10_2, \ldots 10_n$, which may consist of load cells, produce electric signals, which represent respectively the weights of articles on the respective balances, preferably in digital form, and will be referred to hereinunder as "weight signals." The weight signals are coupled respectively through normally-open switches $12_1, 12_2, \ldots 12_n$ to a common adder circuit 14. The switches $12_1, 12_2, \ldots 12_n$ are provided respectively with control terminals and arranged to close upon reception of control signals in the control terminals. The control terminals of the switches $12_1, 12_2, \ldots 12_n$ are coupled respectively to the outputs of inhibit gates $16_1, 16_2, \ldots 16_n$ having normal (non-inversion) inputs coupled respectively to n output of a combination generator 18.

The combination generator 18 is a device for producing control signals from its outputs successively in accordance with a predetermined set of mathematical combinations of the output terminals. A typical example utilizable as this combination generator is an n-bit binary counter driven by a suitable clock pulse generator 20, having parallel outputs or bit outputs used as the outputs of the combination generator 18, respectively. In this case, the total number of possible combinations of the output terminals should be $2^n - 1$ and all combinations of outputs will be produced successively. When the switches $12_1, 12_2, \ldots 12_n$ are arranged to close in response to a binary "1" control signal, for example, the switches will encounter all combinations of actuation while the counter counts from zero to a binary digit having all bits of "1".

It should be understood that the combination generator 18 is not limited to the n-bit binary counter but can be realized with various circuits by those skilled in the art in accordance with user's requirements. For example, the combination generator 18 may be designed so as to produce only combinations of m (which is less than n) outputs from the n outputs in order to save operation time.

The inhibit inputs (inversion inputs) of the inhibit gates $16_1, 16_2, \ldots 16_n$ are coupled respectively through normally-open manually-actuated switches $22_1, 22_2, \ldots 22_n$ to a potential source 24 which provides a voltage level preferably equivalent to that of the control signals from the combination generator 18, that is, logic level "1" in this example. When any of the switches $22_1, 22_2, \ldots 22_n$ is closed manually, the level "1" is applied through the closed switch to the corresponding inhibit gate to close it, thereby inhibiting application of the control signal from the combination generator 18 to corresponding one of the normally-open switches $12_1, 12_2, \ldots 12_n$. Thus, no weight signal is applied to the adder circuit 14 from the corresponding weighing balance and the device can continue operation as it is, excepting the inhibited weighing balance. In other words, the operation of any balance can be stopped for repair or other maintenance treatment by simply closing the corresponding one of the inhibit switches $22_1, 22_2, \ldots 22_n$, without the need of interrupting the normal operation of the device.

The intended "preset weight" is previously stored in a preset weight memory 26 and predetermined allowable upper and lower deviations are respectively stored in allowable upper deviation (AUD) memory 28 and allowable lower deviation (ALD) memory 30. These memories may be of conventional type having keyboard inputs. The content of the AUD memory 28 is added to the content of the preset weight memory 26 in an adder 32 and the resultant output representative of the upper limit of allowance is applied to an upper limit comparator 36. The content of the ALD memory 30 is subtracted from the content of the preset weight memory 26 in a subtractor 34 and the resultant output representative of the lower limit of allowance is applied to a lower limit comparator 38. The other inputs of the comparators 36 and 38 are supplied from the adder circuit 14 as a total weight from selected balances. The comparator 36 compares the output of the adder 14 with the output of the adder 32 to produce an output when the former is less than the latter, and the comparator 38 compares the output of the adder 14 with the output of the subtractor 34 to produce an output when the former is greater than the latter. Thus, when the sum output from the adder circuit 14 is within the preset range between the upper and lower limits, the outputs of both comparators 36 and 38 are supplied to an AND circuit 40 at the same time, and the AND circuit 40 applies its output to a gate circuit 42. The gate circuit 42 has a plurality of inputs coupled respectively through the inhibit gates $16_1, 16_2, \ldots 16_n$ to the outputs of the combination generator 18, and is arranged to pass these outputs in response to the output of the AND circuit 40 to gate control devices (not shown) for controlling gates of the corresponding weighing balances to effect unloading and loading of the articles.

Although the above description has been made with reference to a typical example of a combination weighing device, it should be noted that various modifications and changes can be made by those skilled in the art within the scope of this invention.

What is claimed is:

1. A combination weighing device comprising a plurality of weighing balances for measuring weights of a plurality of articles each to produce weight signals representative of said weights, an arithmetic unit having a plurality of inputs for summing up said weight signals received therein and comparing the resultant sum with a predetermined range of weight to produce an output when said sum is within said range, a plurality of normally-open switches each having a control terminal and coupled respectively between said weighing balances and said outputs of said arithmetic unit, switch control means having a plurality of outputs coupled respectively to said control terminals of said normally-open switches for providing control signals successively from the outputs selected in accordance with a predetermined set of combinations, and means for supplying the control signals from said switch control means to utilization devices in response to said output of said arithmetic unit, wherein said device further comprises means for inhibiting selectively application of said weight signal from any weighing balance to said arithmetic unit and application of said control signal from the corresponding output of said switch control means to said utilization device, thereby permitting interruption of operation of the corresponding weighing balance without interrupting the device operation.

2. A combination weighing device, according to claim 1, wherein said inhibiting means comprises a plurality of inhibit gates inserted between the outputs of said switch control means and said control terminals of said normally-open switches, each of said inhibit gates having an inhibit input selectively coupled to an operational potential to inhibit the passing of said control signal through said inhibit gate to said control terminal.

* * * * *

UNITED STATES PATENT OFFICE
CERTIFICATE OF CORRECTION

Patent No. 4,336,852  Dated June 29, 1982

Inventor(s) Takashi Hirano

It is certified that error appears in the above-identified patent and that said Letters Patent are hereby corrected as shown below:

Claim 1, column 4, line 14, the word "outputs" should be --inputs--

Signed and Sealed this

Nineteenth Day of April 1983

[SEAL]

Attest:

GERALD J. MOSSINGHOFF

Attesting Officer  Commissioner of Patents and Trademarks